United States Patent

Tatsuno et al.

[11] Patent Number: 5,281,797
[45] Date of Patent: Jan. 25, 1994

[54] SHORT WAVELENGTH OPTICAL DISK HEAD HAVING A CHANGEABLE APERTURE

[75] Inventors: Kimio Tatsuno, Kodaira; Shigeru Nakamura, Tachikawa; Hisataka Sugiyama; Masahiko Takahashi, both of Kodaira, all of Japan

[73] Assignee: Hitachi, Ltd., Tokyo, Japan

[21] Appl. No.: 996,033

[22] Filed: Dec. 23, 1992

[30] Foreign Application Priority Data

Dec. 26, 1991 [JP] Japan .................................. 3-344729

[51] Int. Cl.⁵ .................................................. G01S 1/20
[52] U.S. Cl. ............................. 250/201.5; 369/117; 369/118
[58] Field of Search .................... 250/201.5, 216, 201.2, 250/201.3; 369/44.23, 44.24, 117, 118

[56] References Cited

U.S. PATENT DOCUMENTS

| | | | |
|---|---|---|---|
| 4,079,248 | 3/1978 | Lehureau et al. | 250/201.5 |
| 4,638,471 | 1/1987 | van Rosmalen | 369/44.24 |
| 4,694,443 | 9/1987 | Ando | 250/201.5 |

Primary Examiner—David C. Nelms
Assistant Examiner—S. B. Allen
Attorney, Agent, or Firm—Antonelli, Terry, Stout & Kraus

[57] ABSTRACT

An optical disk head having a short wavelength light source has an aperture diaphragm placed in the course of its focusing optical system which can change its aperture diameter depending on the pit size on an optical disk in order to allow recording on and reproducing from not only a short wavelength optical disk, but also a long wavelength optical disk. The aperture diameter is made larger for the smaller pit size and vice versa, and the light source output is adjusted depending on the aperture diameter so that the light amount coming from the disk surface to a photodetector cannot be changed with the aperture diameter.

10 Claims, 4 Drawing Sheets

SHORT WAVELENGTH OPTICAL DISK HEAD HAVING A CHANGEABLE APERTURE

BACKGROUND OF THE INVENTION

The present invention relates to a short wavelength optical disk head that is compatibly capable of recording on and reproducing from a long wavelength optical disk with use of short wavelength.

An optical disk can record information such as images, sounds and data on it at a high density or reproduce any of them from it, so that the information can be recorded and reproduced at high S/N ratio.

Light sources for prior optical disk heads, which are of semiconductor lasers, generate infrared lights of around 780 and 830 nm wavelengths. Recording density of the optical disk is made high as the wavelength of the light source is short. In recent years, therefore, in order to increase the recording density several times that of the infrared light, it has been attempted to use as the light source for an optical disk, second harmonics of the semiconductor laser or of the solid state laser and short wavelength lasers of red, yellow, green, blue, violet, ultraviolet having wavelength of shorter than 700 nm. The short wavelength lasers employ semiconductor crystals of II-VI compounds which provide wide bandwidths. If the wavelength of the light source is halved, for example, the diameter of the focused light spot is halved. The area becomes one fourth. As a result, the recording density of the optical disk is multiplied by four. There are known reports about the optical disk, such as Masabumi Mori et al, "Hikari Disk" (Optical Disk), page 2, May 10, 1988, Ohm Publishing Co.; and G. Bouwhuis et al, "Principles of Optical Disc Systems," pp. 2-3, 1985, Adam Hilger Ltd.

As such, the very high density optical disk for use with the light source of shorter wavelength has to naturally have smaller size of minimum units, which is called the pits, for recording and reproducing signals with decreasing the wavelength. Also, the track pitch has to be made narrower with decreasing the wavelength. If the second harmonics of such a solid state laser as Nd:YAG or Nd:YVO$_4$ laser is used to obtain wavelength of 530 nm, as an example, then the track pitch becomes 0.9 $\mu$m and the pit size is 0.4 $\mu$m. On the other hand, the usual compact disks (CD) having used infrared lights of around 780 and 830 nm wavelengths are 1.6 $\mu$m in the track pitch and around 0.7 $\mu$m in the minimum pit size.

FIG. 2 is a graph illustrating the light intensities of the light spots formed on the optical disk. In the figure are indicated an optical disk 7, pits 13 and 14 on the disk 7, and light intensity curves 11 and 12 of the light spots formed on disk 7 by the laser beam. The solid curve and line in the figure indicate the light intensity of the light spot and the pit for a short wavelength of 700 $\mu$m or shorter. The dotted curve and line are the light intensity of the light spot and the pit for a wavelength of longer than 700 $\mu$m.

The optical disk for the shorter wavelength has to have resolution increased by narrower light spot 11 enough to provide high modulation depth for signal reproduction. The reason is that the disk is smaller in the size of pit 13. The optical disk for the longer wavelength, on the other hand, should played back with larger spot 12 to provide high modulation as the disk is larger in the size of pit 14. In other words, if the depth of the pit is around $\lambda/4$ where $\lambda$ is the wavelength of the laser beam, an optimum diameter of the light spot is around two times that of the pit, that is, an optimum diameter of the pit is around one second of that of the light spot since the light of the light spot reflected from the inside of the pit deviates by phase of $\pi$ from the light reflected from the outside of the pit.

Therefore, if the newly developed short wave optical disk driver plays back the convertional long wavelength optical disk (CD) available on the market heretofore, the diffraction effect of the light is reduced with the long wavelength CD played back by the smaller light spot 11 as it is, since pit 14 is larger. This results in decreased modulation depth for presence and absence of the pit. This in turn results in decreased signal-to-noise ratio of the reproduced signal. If the long wavelength optical disk driver plays back the short wavelength optical disk, on the contrary, it also reduces the diffraction effect of the light with the short wavelength optical disk played back by the larger light spot 12 as it is, since pit 13 is smaller. This also results in decreased modulation depth for presence and absence of the pit. This again results in decreased signal-to-noise ratio of the reproduced signal.

Types of the optical disks include a rewritable type, and a write once type, in addition to reproduction only type such as of compact disk. That is, the magneto-optical disk should have data erased once before newly writing the data since it cannot simultaneously erase and write the data. There however was recently proposed an overwriting technique in which data can be rewritten at a time. In connection with the material for the optical disk, a phase change type disk was proposed in which its crystal state can be changed to amorphous state, and vice versa. There also is used a write once type optical disk that has a partial area in which data can be written with laser beam irradiated to make pits.

As pointed out above, it is anticipated that the optical disk will be made denser year after year with use of shorter wavelength of the light source. However, this involves a problem of compatibility of new very high density optical disks developed in future with the usual optical disks at present. In other words, it is a serious problem to solve of whether the very high density optical disk driver having the short wavelength light source can play back the conventional compact disk (CD) or laser disk. If the compatibility is ignored in that sense, this makes it impossible to play back numbers of usual optical disks having already come into wide use in homes and offices. This is an act of treachery for customers and consumers. It is an important issue imposed on not only the reproduction only optical disk, but also the rewritable magneto-optical disk, phase change type disk, and write once type optical disk.

In order to solve that problem, the Japanese Patent Application Laid-Opens 64-3833 and the 02-252137 disclosed an optical head having an aperture diaphragm for restricting diameter of a light beam placed in front of an object lens for focusing the light beam onto an optical recording medium. The aperture diaphragm has the disadvantage: the aperture diameter of the aperture diaphragm made smaller causes shading for the light. The shading decreases the light amount coming to the optical recording medium. This also results in decreased light amount coming to a photodetector, which in turn results in decreased signal intensity.

SUMMARY OF THE INVENTION

In view of the foregoing, it is an object of the present invention to provide a short wavelength optical disk head that has compatibility with the conventional long wavelength optical disk with use of even short wavelength of its light source without decreasing the signal intensity.

Briefly, the foregoing object is accomplished in accordance with aspects of the present invention by the short wavelength optical disk head comprising at least one coherent light source having at least one wavelength, a focusing optical system having an object lens for focusing light beam radiated out of the light source onto an optical disk, a photodetector for detecting a light reflected from or having transmitted through the optical disk to convert the light to electrical signal, and a leading optical system for leading the reflected or transmitted light to the photodetector. The focusing optical system has an aperture diaphragm therein aperture of which can be changed depending on the size of pits or the track pitch on the optical disk. The light beam power out of each coherent light source can be adjusted depending on aperture diameter of the aperture diaphragm.

It is preferable that the aperture diaphragm should be placed at the pupil of the focusing lens, or the object lens, for focusing the light beam onto the optical disk. It is possible not only that the aperture diaphragm is only for reproduction from audio or video optical disks, but also that the aperture diaphragm is of rewritable type for use with a magneto-optical disk, a phase change type disk, and a write once type optical disk. The focussing optical system can adjust an angle contained between a three-spot train for tracking and a pit track depending on a track pitch of the optical disk, as known well.

As described above, the optimum diameter $\gamma$ of the light spot focused on the optical disk is around two times the diameter d of the pit formed on the optical disk ($2d = \gamma$). Let NA denote a numerical aperture of the object lens. The optimum diameter $\gamma$ and the numerical aperture NA can be given as $$\gamma = \lambda/NA \tag{1}$$

$$NA = \sin\theta \tag{2}$$

where $\lambda$ is wavelength of the light beam out of the light source, and $\theta$ is an angle contained between the light beam, which lies from a center of the collimator lens for making parallel the light coming out of the light source to the light spot, and an optical axis. Hence, $\gamma = \lambda/\sin\theta$. Since $2d = \gamma$ as mentioned above, the optimum values of NA and $\theta$ can meet the equations $NA = \lambda/2d$ and $\sin\theta = \lambda/2d$, respectively. The aperture diaphragm should be adjusted to satisfy the equations depending on the pit diameter d. Other types of disk than the pit type can be made up in a way similar to the method described above.

The output of the light source should be adjusted depending on the aperture diameter of the aperture diaphragm to prevent the light amount reaching to the optical disk from changing with the aperture diameter of the aperture diaphragm. If the aperture diameter $a_1$ is varied to $a_2$, the light amount reaching the optical disk changes from $P_1$ to $P_2$. The current injected into the semiconductor laser should be adjusted so as to keep a relationship of $P_1 = P_2$. The output of the light source is increased with an increase of the current into the semiconductor laser; it is decreased with decease of the current.

The track pitch on the optical disk should be preferably around two times the pit diameter d. In short, it is preferable to make the track pitch 2d and the light spot diameter 2d as well.

So far as described above, the present invention has the aperture diaphragm of adjustable diameter placed in the course of the optical system for focusing the image of the light source on the optical disk so that the optimum light spot can be formed on the optical disk depending on the given track pitch or minimum pit size on the optical disk. Thus, for the short wavelength optical disk having finer pits and narrower track pitch, the aperture diameter of the aperture diaphragm should be made larger to make the focused light spot diameter smaller to increase the resolution for obtaining a sufficient signal modulation depth. For the long wavelength optical disk having relatively coarser pits and wider track pitch, on the other hand, the aperture diameter of the aperture diaphragm should be made smaller to make the focused light spot diameter larger to decrease the resolution for obtaining a sufficient signal modulation depth. As a result, the short wavelength optical disk head of the present invention can always select a spot diameter optimum for recording and for maximizing the reproduction signal-to-noise ratio whatever pit diameter and track pitch the given optical disk has.

Further, the short wavelength optical disk head of the present invention has means for adjusting current injected to the semiconductor laser of the light source to make constant the light amount coming from the light source to the optical disk. So, the light amount reaching the optical disk cannot be decreased, but stably constant at all times even if the aperture is made narrower, so that the performance thereof is stable.

The coherent short wavelength light source has the wavelength of not longer than 700 nm. As examples, there can be shown second harmonics lasers, II-VI compound semiconductor lasers, III-V compound semiconductor lasers, frequency upward conversion lasers, and wavelength conversion lasers.

The short wavelength optical disk head of the present invention can be structured with use of prior knowledge except that the optical system for focusing the light spot onto the optical disk has the aperture diaphragm of variable aperture diameter placed therein, has means for not allowing the light amount reaching the optical disk to change with the aperture diameter of the aperture diaphragm by way of adjusting the output of the light source depending on the aperture diameter of the aperture diaphragm, and has a control system for make the aperture diameter of the aperture diaphragm optimum for the pit diameter on the optimum disk if necessary.

BRIEF DESCRIPTION OF THE DRAWINGS

The present invention may be more fully described by reference to the accompanying drawings.

DETAILED DESCRIPTION OF THE PREFERRED EMBODIMENTS

The following describes in detail embodiments according to the present invention by reference to the accompanying drawings.

Embodiment 1

Figure 1:
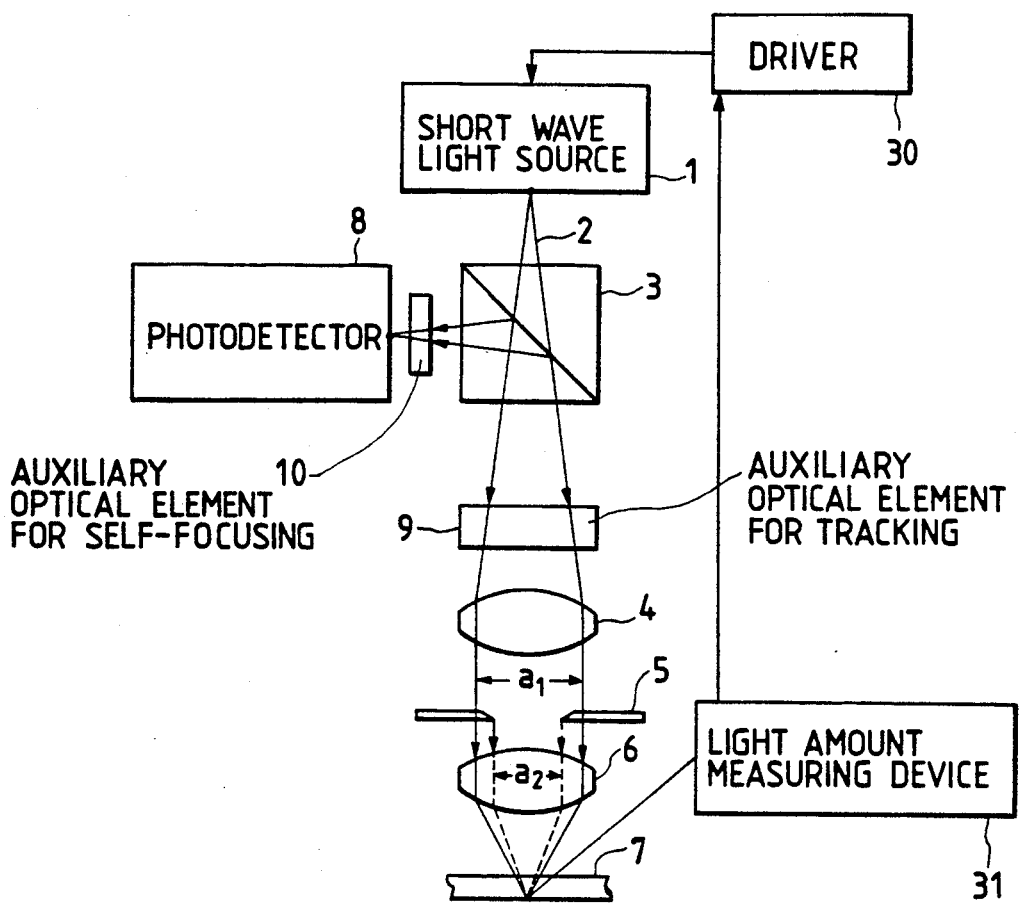
FIG. 1 is a block diagram illustrating the structure of a short wavelength optical disk head in one embodiment of the present invention.

FIG. 1 is a block diagram illustrating a short wavelength optical disk head in the present embodiment according to the present invention.

In FIG. 1, numeral 1 denotes a short wavelength light source employing a semiconductor laser or employing a harmonic wave by way of nonlinear optics, 2 a laser beam, 3 a beam splitter for dividing laser beam 2 to two, 4 a collimator lens for collimation, 5 an aperture diaphragm, 6 an object lens, 7 an optical disk, 8 a photodetector, 9 an auxiliary optical element for tracking, and 10 an auxiliary optical element for self-focusing. Auxiliary optical element 9 for tracking is made of a known auxiliary optical device, such as a diffraction grating, for tracking of light spot, and auxiliary optical element 10 for self-focusing is a known auxiliary optical device, such as a cylindrical lens, for self-focusing of the light spot. Numeral 30 denotes a driver for injecting current into the semiconductor laser of the light source 1.

Laser beam 2 radiated from the short wavelength light source 1 comes to the collimator lens 4 through the beam splitter 3 and the auxiliary optical element 9 for tracking. Laser beam 2 then comes through aperture diaphragm 5 and is focused by the object lens 6 for reading whether there is a pit written at a position on optical disk 7. Collimator lens 4 and object lens 6 may be integrated together.

The light reflected by the optical disk 7 returns to the beam splitter 3 through the object lens 6 and the collimator lens 4. The light is further reflected by the beam splitter 3 to come to photodetector 8. Photodetector 8 can convert the light to electric signal, which is processed by a processing circuit (not shown).

Figure 2:
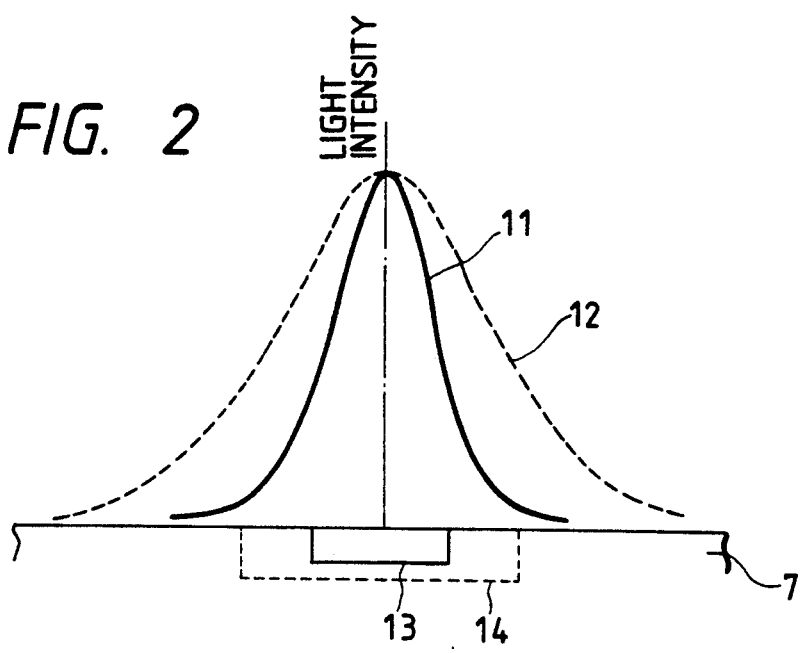
FIG. 2 is a graph showing the light intensity distributions of optical spots formed on an optical disk.

Aperture diaphragm 5 is a new additional device provided in the present embodiment. Aperture diaphragm 5, as shown in FIG. 2, serves to provide an optimum light spot diameter either for a smaller pit diameter 13 on optical disk 7 or for a larger pit diameter 14 thereon. If the smaller pit diameter 13 is used, for example, aperture diameter of the aperture diaphragm 5 should be made larger to $a_1$ to make the focused light spot diameter narrower. If the larger pit diameter 14 is used, on the other hand, aperture diameter of the aperture diaphragm 5 should be made smaller to $a_2$ to make the focused light spot diameter wider.

Let $\lambda$ and NA denote the light spot diameter and a numerical aperture. These can be given as $$\gamma = \lambda/NA \quad (1)$$

$$NA = \sin \theta \quad (2)$$

where $\lambda$ is wavelength, and $\theta$ is an angle contained between a center of the collimator lens 4 and the laser beam coming into the pit. It can be clearly seen in Eq. (1) that the spot diameter can be made small as the aperture diameter is large. It also can be seen in Eq. (2) that the light amount coming to the disk is reduced as the aperture diameter is small, resulting in shade for the light.

As described previously, aperture diaphragm 5 may have its aperture adjusted depending on the pit diameter d so that the relation represented by $NA = \lambda/2d$ or $\sin \theta = \lambda/2d$ should be met.

For the large pit diameter in FIG. 1, the aperture of the aperture diaphragm 5 should be made narrow to reduce an effective numerical aperture to make the light spot size large. This leads to the restoration of a diffraction effect to that given when a long wavelength light source is used. This can increase a modulation depth for presence and absence of the pit so that signal-to-noise ratio of a reproduction signal can be increased.

For adjusting aperture diaphragm 5, it should be placed between collimator lens 4 and object lens 6, particularly it is more preferable that it is placed at the position of a pupil of a focusing lens, i.e. the object lens 6. The term "pupil" as used herein denotes a surface that is Fourier-transformed for a position of the light spot on the disk.

Figure 3A:
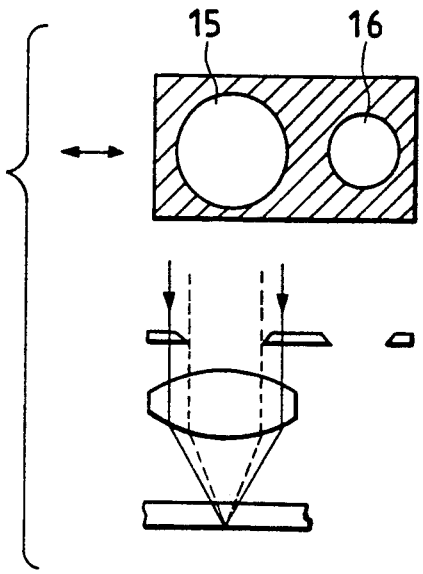
FIG. 3A is a schematic plan view illustrating one embodiment of an aperture diaphragm for use in a short wavelength optical disk head of the present invention and its schematic cross-sectional view illustrating its function.
Figure 3B:
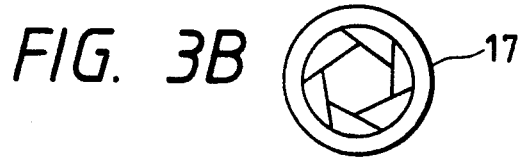
FIG. 3B is a schematic plan view illustrating another embodiment of an aperture diaphragm for use in a short wavelength optical disk head of the present invention.

FIGS. 3A and 3B show structures of aperture diaphragm 5 in FIG. 1.

As shown in FIG. 3A, aperture diaphragm 5 is made of a plate having two or more apertures of different diameters. The plate is mechanically driven by a motor or similar device for selection of one of the aperture depending on the disk given. In the present embodiment, the plate has two apertures 15 and 16, one of which can be selected as the plate is moved in parallel with the disk by the motor. If the larger aperture is selected, the light beam is formed as shown by solid lines in the figure. If the smaller aperture is selected, the light beam is formed as shown by dotted lines in the figure. Note that the plate can be made to revolve instead of the parallel motion.

FIG. 3B shows another embodiment of aperture diaphragm 5 which employs a diaphragm 17 for use in an ordinary camera together with its drive arrangement. That is, the circular diaphragm 17 should have an aperture that like the aperture described above, can be made large outward or small inward its center depending on the pit diameter on the disk.

Figure 4:
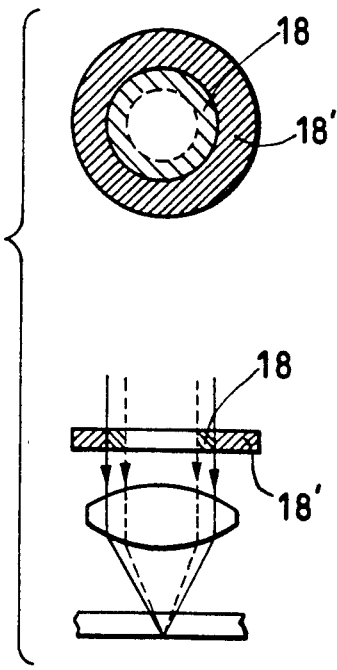
FIG. 4 is a schematic plan view illustrating still another embodiment of an aperture diaphragm for use in a short wavelength optical disk head of the present invention and its schematic cross-sectional view illustrating its function.

FIG. 4 is a schematic plan view illustrating still another embodiment of the aperture diaphragm 5, and its schematic cross-sectional view illustrating its function. While the aperture diameter of the aperture diaphragm 5 shown in FIGS. 3A and 3B is mechanically changed, that of aperture diaphragm 5 in FIG. 4 is electrically changed. This can be made by changing light transmittance of the aperture as a voltage is applied to it. A liquid crystal, for example, is put in a portion 18 shaded in the figure. The transmittance of light passing the liquid crystal can be lowered to make the effective aperture diameter small as the voltage is applied to the liquid crystal. In the figure, the beam is focused to a smaller diameter shown by dotted lines.

If the voltage is removed, the aperture can be returned to have the original higher light transmittance to provide high numerical aperture, so that the beam is focused to a larger diameter shown by solid lines in the figure.

The liquid crystal available for this purpose is of nematic structure or cholesteric structure as an example. The liquid crystal in the present embodiment is made around 10 μm thick. The voltage applied to the liquid crystal is 1 to 60 V. An electrode used for applying the voltage is transparent having a hole corresponding to the aperture. The electrode is provided on both sides of the liquid crystal each. If a plurality of transparent electrodes separated like ring belts and if voltages are independently applied to respective electrodes, the aperture can be varied. In FIG. 4, numeral 18' denotes a holder for the liquid crystal.

In turn, the following describes how to adjust the aperture of the aperture diaphragm 5 for use in the short wavelength optical disk head of the present invention. Let A denote the optical disk for a short wavelength light source and B denote the optical disk for a conventional long wavelength light source. The optical disk A for the short wavelength should have a code recorded on its innermost track or the like in advance, the code indicating that the optical disk is for the short wavelength. The optical disk B for the long wavelength should have another code recorded on its innermost track or the like in advance, the code indicating that the optical disk is for the long short wavelength. If any of the optical disks is played, a head can read the code. The detected code signal prompts the motor for adjusting the aperture diaphragm to be driven or turns on or off the voltage applied to the liquid crystal so that the aperture can be adjusted to the diameter optimum to the optical disk. This can obtain a light spot of the desired diameter. It is preferable that the codes should be recorded employing a plurality of pit diameters corresponding to the every wavelength so that any of the aperture adjusting codes can be read even if the initial spot diameter on the disk is either long or short. However, it is also possible to adjust the aperture even if the code is recorded by a single pit diameter only.

In the aperture adjusting method mentioned above, the adjusting of the aperture can be made in a way that the code corresponding to a proper aperture should be recorded on the disk in advance, and the aperture should be automatically selected as the disk is put on a player. Besides, it can be made in a manual way that the disk should have a label stuck on it, the label having the pit diameter printed on it; a user should look at it, select and press a corresponding one of pit diameter selection buttons arranged on a panel of the player; this should start the motor for adjusting the aperture diaphragm or turn on or off the voltage applied to the liquid crystal so that the aperture should be adjusted for a desired light spot.

It is expected that typical pit diameters of optical disk will be standardized, and thus specifications of the aperture diaphragm will be fixed. In accordance with the specifications, adjusting devices for the aperture diaphragm can be arranged.

As described previously, the short wavelength optical disk head of the present invention is designed so that it can have intensity of the light radiated from the light source adjusted depending on the aperture diameter of aperture diaphragm. This will not change the light amount on the optical disk. That is, if the aperture is changed from $a_1$ to $a_2$ ($a_1 > a_2$) in FIG. 1 and if the intensity of light from the light source is not adjusted, but constant, then the light amount reaching the disk changes, or decreases, from $P_1$ to $P_2$ ($P_1 > P_2$) as $P_2 = P_1(a_2/a_1)^2$. It should be noted that the semiconductor laser used in the light source 1 can adjust its output light by way of changing current injected to it. This can be made also with use of the light source either of a second harmonics of a fundamental wave output of the semiconductor laser or a second harmonics of a solid state laser excited by the semiconductor laser. For this purpose, the light amount reaching the disk should be measured. If the measured light amount decreases from $P_1$ to $P_2$ with the aperture diameter reduced from $a_1$ to $a_2$, driver 30 should be controlled to increase the current injected into the semiconductor laser so as to keep a relationship of $P_1 = P_2$. If the aperture diameter increases from $a_2$ to $a_1$, on the other hand, the driver 30 should be controlled to decrease the current injected into the semiconductor laser so as to keep the light amount constant on the disk, or to keep the relationship of $P_1 = P_2$.

Measuring the light amount reaching the disk can be made in a way that the light amount on a photodetector due to the light returned from the disk is converted to current. A PIN photodiode, as an example, can be used for a photodetector for keeping constant the light amount reaching the disk, and it can also serve simultaneously as the photodetector 8 for signal detection. Alternatively, a light amount measuring device 31 can be provided specially in addition to the photodetector 8. In the former case, the light amount measuring device 31 should be omitted, and the light amount detected by photodetector 8 should control driver 30.

Figure 6A:
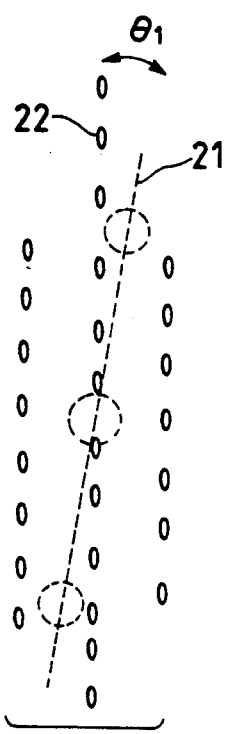
FIGS. 6A and 6B are schematic views illustrating an embodiment of tracking technique in a short wavelength optical disk head according to the present invention.
Figure 6B:
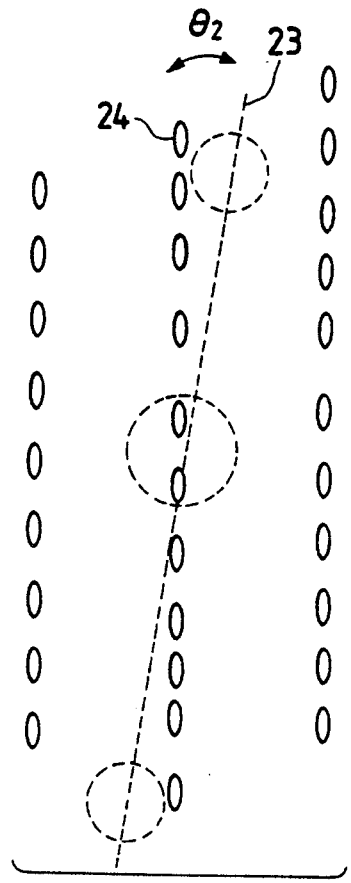
Figure 7:
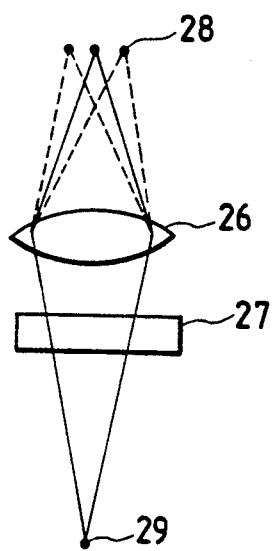
FIG. 7 is a schematic cross-sectional view illustrating light paths in a three-spot technique for tracking in an optical disk head.

In turn, by reference to FIGS. 6A, 6B, and 7, the following describes tracking techniques in which the short wavelength optical disk head of the present invention can follow a pit train on the optical disk.

FIG. 6A shows one of the tracking techniques for the short wavelength optical disk, and FIG. 6B that for the long wavelength optical disk head. The known three-spot tracking technique employed in the present invention accomplishes compatibility of trackings. In FIG. 6A are indicated an optical three-spot train 21 determined for the short wavelength optical disk, a track 22 for the short wavelength optical disk, an angle $\theta_1$ contained between optical three-spot train 21 and track 22. In FIG. 6B are indicated an optical three-spot train 23 determined for the long wavelength optical disk, a track 24 for the long wavelength optical disk, and an angle $\theta_2$ contained between optical three-spot train 23 and track 24. In FIG. 7 are indicated a deviation position 28 of the light source by a mirror, or a pseudo-light source position of a light source image formed by the mirror, a collimator lens 26, an aperture diaphragm or half-wave plate 27, and a light spot 29. The three-spot train, as well known, is formed of a zero order light and a diffracted lights of the order of +1 by employing a diffraction grating. That is, since a center of the optical disk is deviated from that of the motor with the disk starting revolution, there occurs eccentricity between them. In order to make the light spot follow the track certainly, accordingly, the three-spot technique is used to turn on three spots beyond, just above, and behind the light spot. In the event, the light spots on both sides of the track are modulated by the pit train on the disk. The modulation depths for the both sides should be equal so that the center spot of the three spots can be at a center of the track. That is, if the follow-up is made, the light of higher modulation depth is returned from the pit on the disk. If the follow-up fails, on the other hand, the light of lower modulation depth is returned from the pit. Accordingly, the mirror of beam splitter 3 should be adjusted so that both of the light amounts can be made equal. This represents that as shown in FIG. 7, the light source image 28 appears as if it exists at three different positions, resulting in the three spots on the straight line at an angle.

Now, let T denote a track pitch that is a pitch between the pit trains on the optical disk. It is optimum that centers of the light spots on the both sides of the three-spots should be at Ti/4 apart from the track, where i takes 1, 2, and so on. An angle $\theta i$ contained between a line produced to the three spots, or the light spot train 21 or 23, and the track is given as $$\theta i = Ti/4/l \quad (3)$$

where l is an interval between the center spot and the side spots on the disk. Eq. (3) should be met for correct tracking by adjusting the angle $\theta i$ depending on the track pitch Ti. (As described previously, the track pitch Ti, like the light spot diameter, should preferably be two times the pit diameter d.)

Let $T_1$ denote the track pitch for the short wavelength optical disk and $T_2$ denote the track interval for the long wavelength optical disk. Since $T_2 > T_1$, Eq. (3) leads to $$\theta_2 > \theta_1 \quad (4)$$

In FIGS. 6A and 6B, in order to obtain an optimum tracking signal, the optical head should be inclined from its original position so that Eq. (3), hence Eq. (4), should be met.

Embodiment 2

Figure 5:
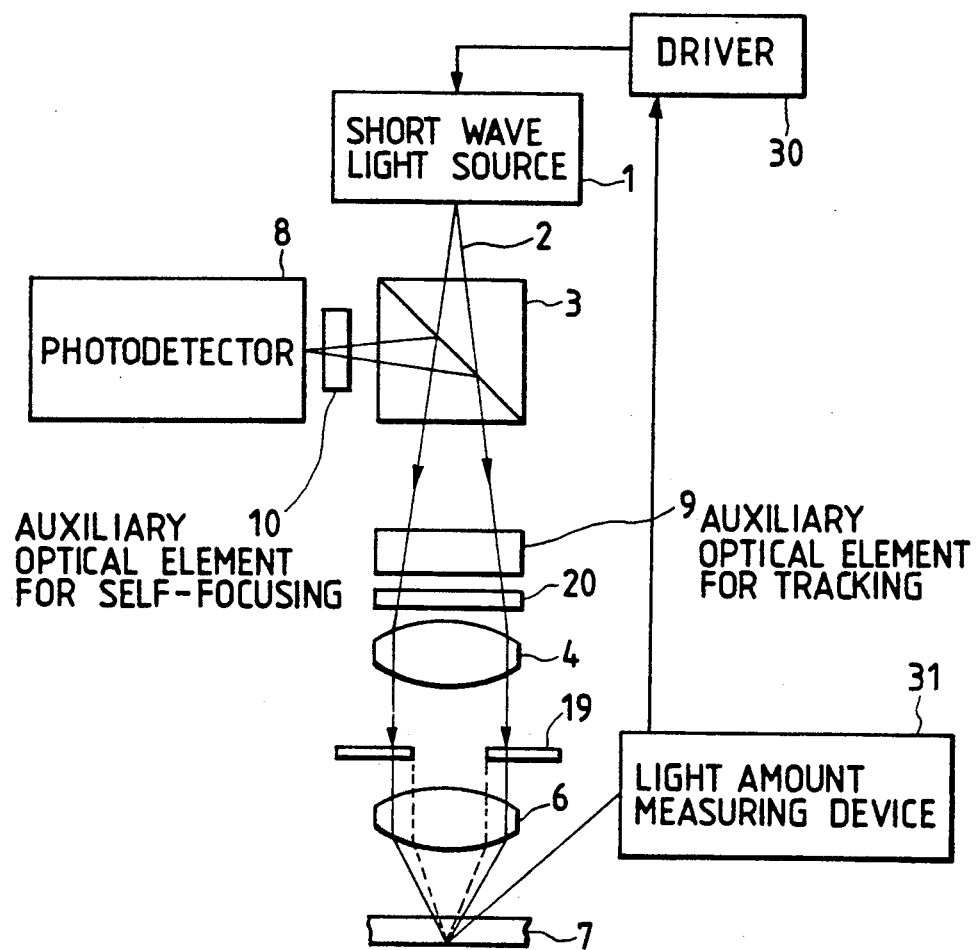
FIG. 5 is a block diagram illustrating the structure of a short wavelength optical disk head in another embodiment of the present invention.

FIG. 5 is a block diagram illustrating a short wavelength optical disk head in the present embodiment according to the present invention. In the figure are indicated a analyzer 19 like ring belt and a half-wave plate 20 for changing direction of polarization by passing or not passing the light through its polarizer. Arrangements and parts in the figure identical with those in FIG. 1 are indicated by the same numerals as in FIG. 1.

Analyzer 19 having a shape like a ring belt is placed at the aperture position of object lens 6, and half-wave plate 20 is put in a light path and is turned 90 degrees. This can change effective numerical aperture in a shape like a ring belt. That is, for a conventional long wavelength optical disk 7, even if the light amount indicated by solid lines in FIG. 5 is made to come in half-wave plate 20, the analyzer 19 gives to object lens 6 only the light amount indicated by broken lines as the light is polarized. Optical disk 7 therefore has a light spot indicated by the broken lines irradiated on it. For the short wavelength optical disk, the half-wave plate 20 is turned 90 degrees from the angle for the long wavelength mentioned above so that analyzer 19 can make larger the beam diameter indicated by the solid lines.

The structures, other than mentioned above, of the short wavelength optical disk head in the present embodiment are the same as in the first embodiment.

In the two embodiments described above, as an example, there is used an optical disk of fourfold density having the track pitch of around 0.6 $\mu$m and the pit diameter of around 0.3 $\mu$m. This optical disk allows recording and reproducing with use of the short wavelength optical disk head having the light source employing the second harmonics of a semiconductor laser and having around 410 nm of wavelength. If object lens 6 has the numerical aperture of 0.4 to 0.5, for example, the short wavelength light spot size obtained is around 1.0 to 0.8 $\mu$m to provide a sufficient resolution. On the other hand, the conventional compact disks and laser disks having the semiconductor laser of 780 nm wavelength used as light source have 1.6 $\mu$m of track pitch and 0.7 $\mu$m of pit size. This short wavelength light spot gives too high resolution to provide sufficient signal modulation depth as the diffraction effect by pit is decreased. However, the aperture diaphragm of the present invention provides such an effect that even with the short wavelength, the short wavelength optical disk head of the present invention can record on and reproduce from the conventional optical disk in the way that the numerical aperture can be properly selected, for example, to 0.2 to 0.3 and the short wavelength light spot size obtained is made 1.4 to 1.9 $\mu$m.

The effect is not only useful for the pits for data and information, but also for reading sample pits for the tracking signal. It allows the short wavelength optical disk head to track a short wavelength, very high density rewritable optical disk accurately to make correct recording and reproducing. The angles $\theta_1$ and $\theta_2$ contained between the three-spot trains and the tracks are determined as $\theta_1 > 0.3°$ and $\theta_2 > 3°$.

Meanwhile, if the light amount reaching the optical disk changes with the change of aperture diaphragm as in the prior art, the aperture causes shading as it is limited. This decreases the light amount on the disk as well as the light amount on photodetector 8. In other words, aperture diaphragm 5 in FIG. 1 or half-wave plate 20 in FIG. 5 limits the light amount; for this reason, a part of light amount cannot reach optical disk 7; this means that the shading decreases the light amount.

The short wavelength optical disk head of the present invention has the means that can adjust the light output of the light source depending on the aperture diameter of the aperture diaphragm in order that the light amount reaching the disk cannot be changed with the aperture diameter. This assures of no decreases of the reaching light amount and the intensity of signal as well even with use of the short wavelength light source for reproducing from the disk having the pits for the long wavelength light source. On the other hand, as for the optical disk head having no means for adjusting the light output of the light source depending on the aperture diameter of the aperture diaphragm, it decreased the intensity of signal and the signal-to-noise ratio by around 5 dB with narrower aperture as compared with it with full aperture. Note that the narrower aperture was for reproduction from the conventional disk of long wavelength pits corresponding to the light source of 780 nm wavelength with use of the short wavelength light source, and the full aperture was for reproduction from the disk of short wavelength pits. However, as for the short wavelength optical disk head in each of the present embodiments having the means capable of adjusting the light output of the light source depending on the aperture diameter, it was not seen that such a decrease of the signal-to-noise ratio occurred.

The usual audio compact disk and the visual laser disk are used only for reproduction, so that the optical disk heads of the present invention for these purpose are also for reproduction only. The previously-mentioned magneto-optical disk, phase change type disk, and write once type optical disk are all rewritable, so that the optical disk heads of the present invention for these purposes are also rewritable type.

As for matters which are not described in this specification as to the structure of the short wavelength optical disk head of the present invention, they can adopt conventional knowledge in the art field thereof.

From the description so far given, the advantages of the short wavelength optical disk head of the present invention reside in particular in the fact that it can not only make recording on and reproduction from the short wavelength, very high density optical disk, but also make recording on and reproduction from the conventional long wavelength optical disks. This means that compatibility can be kept from generation to generation.

What is claimed is:

1. A short wavelength optical disk head, comprising: at least one coherent light source,
a focusing optical system for focusing light beam radiated out of said light source onto an optical disk,
a photodetector for detecting a light reflected from or having transmitted through said optical disk to convert said light to electrical signal, and
a leading optical system for leading the reflected or transmitted light to said photodetector;
characterized in that said focusing optical system has an aperture diaphragm therein aperture of which can be changed depending on the diameter of pits on said optical disk, and said optical disk head has the means for not allowing light amount coming from said optical disk to said photodetector to change with said aperture diameter by way of adjusting output of said light source depending on aperture diameter of said aperture diaphragm.

2. A short wavelength optical disk head according to claim 1, wherein said aperture of said aperture diaphragm is placed at the position of a pupil of an object lens for focusing said light beam onto said optical disk.

3. A short wavelength optical disk head according to claim 1, wherein said aperture diaphragm is only for reproduction from audio or video optical disks.

4. A short wavelength optical disk head according to claim 1, wherein said aperture diaphragm is of the rewritable type for use with a magneto-optical disk, a phase change type disk, and a write once type optical disk.

5. A short wavelength optical disk head according to claim 1, further comprising means of three-spot technique for adjusting an angle $\theta i$ contained between a tracking three-spot train and a pit track depending on a track pitch of said optical disk so as to make tracking accurate.

6. A short wavelength optical disk head according to claim 1, wherein wavelength of said light source is not longer than 700 nm.

7. A short wavelength optical disk head according to claim 6, wherein said light source employs a semiconductor laser.

8. A short wavelength optical disk head according to claim 1, wherein said aperture diaphragm has a numerical aperture NA equal to $\lambda/2d$ where $\lambda$ is wavelength of said output of said light source and d is said diameter of the pit on said optical disk.

9. A short wavelength optical disk head according to claim 5, wherein said means of three-spot technique can adjust the angle $\theta i$ to meet an equation $\theta i = Ti/4/l$ where Ti is said track pitch on said optical disk and l is an interval between a center spot and side spots of said three-spot train on the disk.

10. A short wavelength optical disk head according to claim 7, further comprising means for increasing current injected to said semiconductor laser for narrower aperture diameter of said aperture diaphragm and for decreasing said current for wider aperture diameter of said aperture diaphragm.

* * * * *